United States Patent [19]

Okura et al.

[11] Patent Number: 4,951,083
[45] Date of Patent: Aug. 21, 1990

[54] CAMERA WITH FLEXIBLE-MEANS GUIDE STRUCTURE

[75] Inventors: Zenichi Okura, Ichikawa; Shinsuke Kohmoto, Tokyo, both of Japan

[73] Assignee: Asahi Kogaku Kogyo K.K., Tokyo, Japan

[21] Appl. No.: 320,625

[22] Filed: Mar. 8, 1989

[30] Foreign Application Priority Data

Mar. 11, 1988 [JP] Japan .............................. 63-32278[U]

[51] Int. Cl.⁵ .............................................. G03B 7/00
[52] U.S. Cl. ..................................... 354/485; 354/286
[58] Field of Search ................................ 354/485, 286

[56] References Cited

FOREIGN PATENT DOCUMENTS 62-264034 11/1987 Japan .
63-39216 3/1988 Japan .

*Primary Examiner*—Russell E. Adams
*Attorney, Agent, or Firm*—Sandler, Greenblum & Bernstein

[57] ABSTRACT

In a camera, a shutter unit is mounted to a movable lens system for movement therewith along an optical axis. An annular member is arranged between the shutter unit and a camera body, for moving the shutter unit. A control signal from a control unit within the camera body is supplied to the shutter unit through a flexible element. The flexible element is turned back plurality of times within a space defined by the annular member so as to have at least two first and second turned-back portions spaced away from each other along the optical axis, whereby the flexible element has at least three sections including a first section extending between the shutter unit and the first turned-back portion, a second section extending between the first and second turned-back portions, and a third section extending between the second turned-back portion and the control unit. These sections overlap with each other in a direction normal to the optical axis.

13 Claims, 3 Drawing Sheets

FIG. I

CAMERA WITH FLEXIBLE-MEANS GUIDE STRUCTURE

BACKGROUND OF THE INVENTION

This invention relates to a camera and, more particularly, to a structure for guiding a flexible means through which a control signal is supplied to a shutter unit in a camera of the lens-shutter type equipped with a zoom lens system.

The assignee of this application has developed a camera of the lens-shutter type equipped with a zoom lens system, and has filed Japanese Patent Application No. SHO 61-108278, Japanese Utility Model Application No. SHO 61-132669 and so on relating to the camera. The subject matter of these applications have already been reduced commercial to products. In the camera, at least two forward and rearward zoom lens systems are adapted to be moved along an optical axis independently of each other, to effect zooming. An annular shutter unit is arranged about an outer periphery of the forward lens systems. Since the forward lens system functions as a focusing lens system, the forward lens system is also driven by a lens drive device that is incorporated into the shutter unit.

The conventional camera described above employs a a flexible printed circuit board in order to send a plurality of operational and control signals to the shutter unit from a distance measuring unit, and an exposure control unit which are arranged within a camera body.

If an amount of movement of the forward lens system is large, however, there arises the problem of slack of the flexible printed circuit board. In view of the problem, the assignee of this application has proposed a guide structure for the flexible print circuit board in Japanese Utility Model Application No. SHO 61-132659 (generally corresponding to U.S. application Ser. No. 144,030). The guide structure is so designed as to utilize an annular space between a cam follower ring for the forward lens system and a cam ring for driving the cam follower ring. The shutter unit is fixedly secured to the cam follower ring. Specifically, the above annular space is utilized in such a manner that the flexible print circuit board is led into the annular space, and is turned back within the annular space.

In a camera which has been developed by a assignee of this application in an attempt to make the compact camera, however, the aforesaid annular space is eliminated so that the cam follower ring is supported directly by the inner peripheral surface of the cam ring. Thus, it is no longer possible to utilize the conventional guide structure for the flexible print circuit board.

SUMMARY OF THE INVENTION

It is therefore an object of the present invention to provide an improved camera that is capable of accommodating a flexible means connecting a shutter unit and control means therefor to each other, in a narrow space, thereby enabling a lens barrel and in turn, a camera to be compactly constructed.

For the above purpose, according to the invention, there is provided a camera which comprises:
  a camera body;
  a movable lens system arranged for movement relative to the camera body along a predetermined optical axis;
  a shutter unit mounted to the movable lens system for movement therewith along the optical axis;
  an annular member arranged between the shutter unit and the camera body, for moving the shutter unit along the optical axis;
  control means arranged within the camera body for supplying a control signal to the shutter unit for controlling the operation of the camera body; and
  flexible means for electrically connecting the control means to the shutter unit, the control signal from the control means being supplied to the shutter unit through the flexible means.
  wherein the flexible means extends from the shutter unit to the control means in such a manner that the flexible means is turned back a plurality of times within a space defined by an inner peripheral surface of the annular member so as to have at least two first and second turned-back portions spaced away from each other along the optical axis, whereby the flexible means has at least three sections, a first section extending between the shutter unit and the first turned-back portion, a second section extending between the first and second turned-back portions, and a third section extending between the second turned-back portion and the control means, which sections overlap with each other in a direction normal to the optical axis.

As described above, the flexible means of the camera according to the invention is accommodated in the space defined by the inner peripheral surface of the annular member in such a manner that the flexible means is so turned back as to have at least three sections overlapping with each other in the direction normal to the optical axis. With such arrangement, the flexible means can expand and contract following movement of the shutter unit along the optical axis. Thus, the invention is effectively applicable to a lens system that is large in the amount of movement of the shutter unit, such as, for example, a zoom lens system. Moreover, the arrangement of the invention can make the camera compact in construction and light in weight.

BRIEF DESCRIPTION OF THE ACCOMPANYING DRAWINGS

DESCRIPTION OF THE EMBODIMENT

Figure 1:
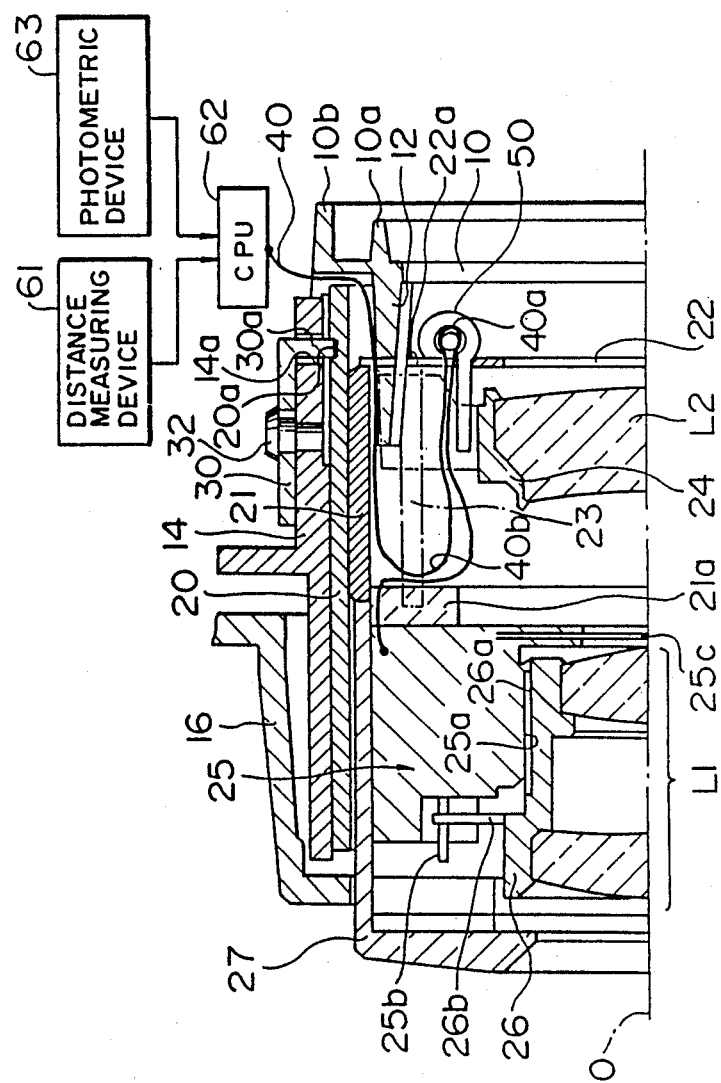
FIG. 1 is a fragmentary cross-sectional view of a lens shutter type camera equipped with a zoom lens system, embodying the invention, with the cross-section taken in a plane including an optical axis, and with a lower half omitted for purposes of simplification.

Referring to FIG. 1, there is shown a cross-section of a lens shutter type camera embodying the invention. The camera comprises forward and rearward zoom lens systems $L_1$ and $L_2$, in which the forward lens system $L_1$ also serves as a focusing lens system. A camera body 10 is integrally formed with a tongue 12 extending substantially parallel to an optical axis O. A stationary tube 14, arranged in concentric relation to the optical axis O, is fixedly mounted to the camera body 10 in such a manner that the tongue 12 projects into the stationary tube 14. The camera body 10 is provided with inner and outer rails 10a and 10b on the side opposite to the tongue 12. The inner and outer rails 10a and 10b form a running guide for a film. The stationary tube 14 has an outer peripheral surface which is covered by a camera body case 16.

A cam ring 20 is fitted in the stationary tube 14 for angularly moving about the optical axis O relative to the stationary tube 14 and for axially moving along the optical axis O relative to the stationary tube 14. An annular member (or first cam follower ring) 21 retaining the forward lens system $L_1$ is fitted in the cam ring 20. The first cam follower ring 21 is supported by the cam ring 20 for moving relative thereto along the optical axis O, while being guided by the cam ring 20.

The first cam follower ring 21 has a rearward axial end to which a light-shielding plate 22 is fixedly secured. A plurality of guide rods 23 extending parallel to the optical axis O are arranged within the first cam follower ring 21. The guide rods 23 have their respective forward ends fixedly connected to a radially inwardly extending flange 21a of the first cam follower ring 21. Rearward ends of the respective guide rods 23 are fixedly secured to the light-shielding plate 22. A second cam follower ring 24, to which the rearward lens system $L_2$ is fixedly mounted, is supported by the guide rods 23 for movement therealong.

Although not shown, the cam ring 20 is formed with a pair of first and second cam slots for moving the forward and rearward lens systems $L_1$ and $L_2$, respectively, along their respective predetermined loci in the direction of the optical axis O. The first cam follower ring 21 is provided with a pin which extends through the first cam slot in the cam ring 20, and is fitted in a linear guide groove in the stationary tube 14. The second cam follower ring 24 is provided with a pin which extends through a relief slot formed in the first cam follower ring 21 and which is fitted in the second cam slot in the cam ring 20.

Accordingly, when the cam ring 20 moves angularly about the optical axis O, the first cam follower ring 21 moves only along the optical axis O without rotating under the interaction of the pin, the cam slot and the linear guide groove, while the second cam follower ring 24 moves only along the optical axis O without rotating under the interaction of the pin, the cam slot and the guide rods 23.

An annular shutter unit 25 is fixedly mounted to the flange 21a of the first cam follower ring 21. The shutter unit 25 has an inner peripheral surface formed with a helicoid 25a. A forward lens ring 26 has an outer peripheral surface formed with a helicoid 26a. The forward lens ring 26 is threadedly engaged with the shutter unit 25 through meshing engagement between the helicoids 25a and 26a. The forward lens system $L_1$ is fixedly mounted to the forward lens ring 26. The shutter unit 25 has a drive pin 25b. The arrangement is such that the shutter unit 25 moves the drive pin 25b angularly about the optical axis O by an angle on the basis of a signal supplied to the shutter unit 25 from a distance measuring device 61 through a CPU (central processing unit) 62. The distance measuring device 61 and the CPU 62 are incorporated in the camera body 10. Further, the shutter unit 25 has a shutter 25c which is opened and closed on the basis of a signal from a photometric device 63 incorporated in the camera body 10.

The drive pin 25b is always engaged with an interlocking arm 26b, which is fixed to the forward lens ring 26 and which extends radially outward. Thus, the forward lens ring 26 moves along the optical axis O in accordance with a rotational angle of the interlocking arm 26b, and the focusing adjustment is carried out. A lens cover tube 27 is fixedly mounted to an outer peripheral surface of the shutter unit 25.

The cam ring 20 is driven for angular movement about the optical axis O by a drive motor through a gear train, both of which are not shown. When the cam ring 20 moves angularly about the optical axis O, the first cam follower ring 21, that is, the forward lens $L_1$ moves along the optical axis O under the action of the first cam slot and the linear guide groove, while the second cam follower ring 24, that is, the rearward lens system $L_2$ moves along the optical axis O under the action of the second cam slot. Thus, a spatial distance between the forward and rearward lens systems $L_1$ and $L_2$ is altered to a setting value, whereby zooming is effected.

A thrust member 30 is mounted on an outer peripheral surface of the stationary tube 14 for movement relative thereto along the optical axis O, for slightly moving the cam ring 20 in a thrust direction. The thrust member 30 has a rearward end 30a which is bent radially inwardly. The rearward end 30a extends through a circumferential loose slot 14a in the stationary tube 14, and is fitted in a circumferential groove 20a in the cam ring 20. The thrust member 30 is formed with a circumferential slot and a pair of guide slots spaced circumferentially from each other and extending parallel to the optical axis O. The thrust member 30 is guided for movement along the optical axis O by straight-advancing guide pins which are fixed to the stationary tube 14 and which extends respectively through the guide slots in the thrust member 30. The thrust member 30 can be moved along the optical axis O by an eccentric pin 32 which extends through the circumferential slot in the thrust member 30 and which is threadedly engaged with the stationary tube 14. Thus, when the eccentric pin 32 moves angularly about its axis, the thrust member 30 is moved along the optical axis O to move the cam ring 20 along the same, whereby back adjustment is carried out.

A flexible printed circuit board 40 is provided which electrically connects the shutter unit 25 and the CPU 62 to each other, for transmitting operational and control signals to the shutter unit 25 from the distance measuring device 61 and the photometry device 63 through the CPU 62. As is known well, the flexible printed circuit board 40 comprises a substrate member made of soft synthetic resinous material and a plurality of lead wires arranged on the substrate member in insulated relation to each other.

A guide structure for the flexible printed circuit board 40, by which the invention is characterized, will be described with reference to FIGS. 1 and 3. The flexible printed circuit board 40 connected to the shutter unit 25 passes through an annular space defined between the first cam follower ring 21 and the tongue 12, and the second cam follower ring 24, and is led to a turning-back element 50, which is fixedly mounted to the light-shielding plate 22.

The flexible printed circuit board 40 is turned back within the turning-back element 50 and is changed to a forward direction. The flexible print circuit board 40 is led to a location adjacent to the shutter unit 25, and is again turned back at the location so that the flexible print circuit board 40 is changed to a rearward direction.

The flexible printed circuit board 40 is further led to an annular space, defined between the first cam follower ring 21 and the tongue 12, and is led to a location on the outside of the first cam follower ring 21 through a window 22a formed in the light-shielding plate 22, which is located radially outwardly of the turning-back element 50. Subsequently, the flexible printed circuit board 40 passes through an annular space defined between the cam ring 20 and the tongue 12, and is led to the CPU 62 within the camera body 10 through a window formed at a proximal end of the tongue 12. In the flexible printed circuit board 40 described above, a turned back portion within the turning-back element 50 and a turned back portion at the location adjacent to the flange 21a of the first cam follower ring 20 will hereinafter be referred to as "fixed turned-back portion 40a" and "movable turned-back portion 40b", respectively.

As mentioned above, the flexible printed circuit board 40 is turned back a plurality of times within the space defined between the first and second cam follower rings 21 and 24 so as to have at least two fixed and movable turned-back portions 40a and 40b. Thus, the flexible printed circuit board 40 has at least three sections, including a first section extending between the shutter unit 25 and the fixed turned-back portion 40a, a second section extending between the fixed and movable turned-back portions 40a and 40b, and a third section extending between the movable turned-back portion 40b and the CPU 62. These sections overlap with each other in a direction normal to the optical axis O.

Figure 2:
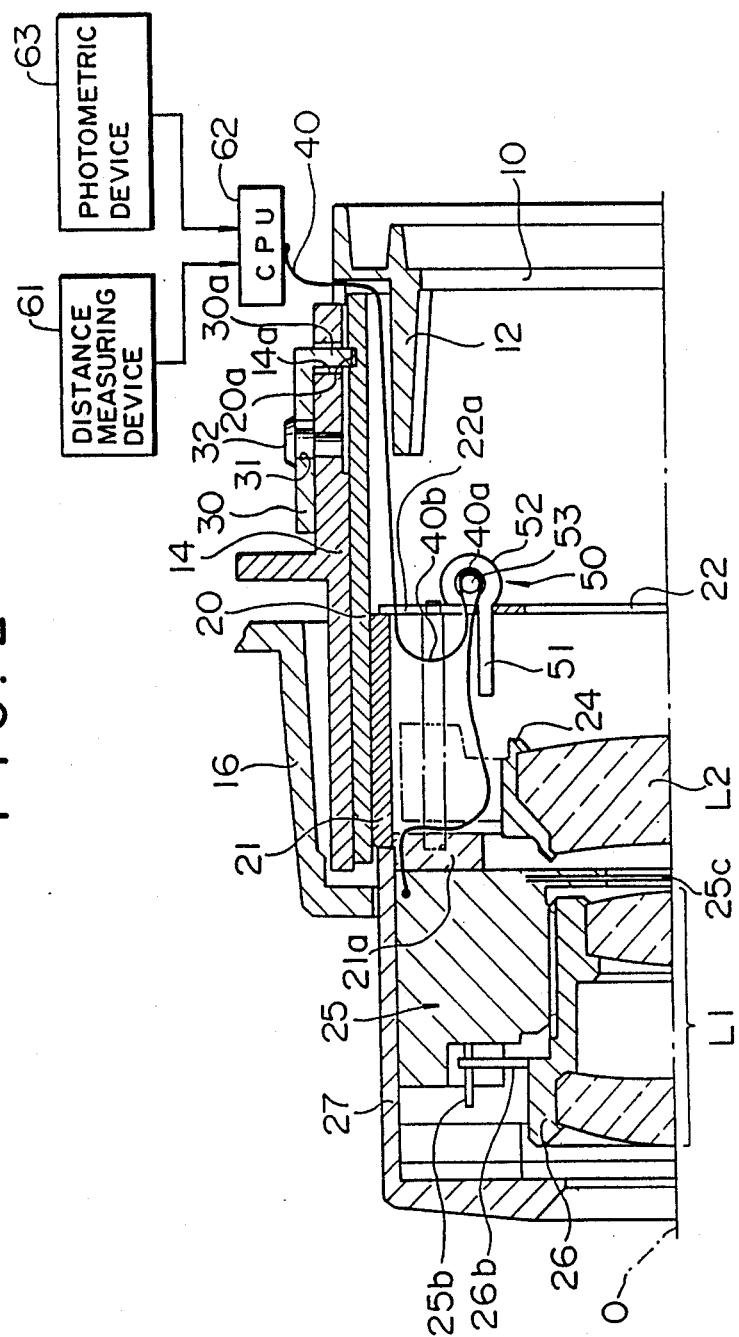
FIG. 2 is a view similar to FIG. 1, but showing a state of a longest focal length in which a lens cover projects to the maximum from a camera body.
Figure 4:
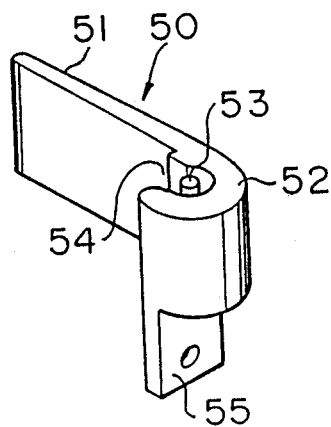
FIG. 4 is an enlarged perspective view of a turning-back element illustrated in FIGS. 1 through 3.

As shown in FIG. 4, the turning-back element 50 is generally in the form of a letter J in plan and has a plate-like guide section 51 and a cylindrical section 52 formed integrally with a rearward end of the guide section 51. As shown in FIGS. 1 and 2, in case the turning-back element 50 is fixedly mounted to the light-shielding plate 22, the cylindrical section 52 is located substantially radially outwardly of a plane including the plate-like guide section 51. The cylindrical section 52 has a bottom wall, and a pin 53 is integrally provided on the bottom wall and is arranged in concentric relation to the cylindrical wall of the cylindrical section 52. An opening 54 is formed in the cylindrical wall of the cylindrical section 52 at a location adjacent to the rearward end of the plate-like guide section 51. The opening 54 extends along an axis of the cylindrical section 52 and faces toward the flange 21a of the first cam follower ring 21. A fixing section 55 integrally projects axially from an outer surface of the bottom of the cylindrical section 52, for fixing the turning-back element 50 to the light-shielding plate 22.

Figure 3:
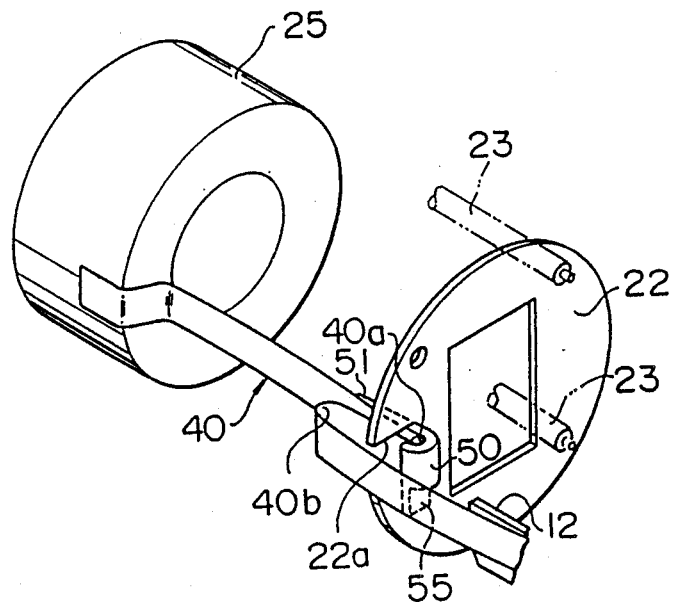
FIG. 3 is a perspective view of a guide structure for a flexible print circuit board illustrated in FIGS. 1 and 2.

As shown in FIGS. 1 and 3, the turning-back element 50 is fixed at the window 22a in the light-shielding plate 22 in such an orientation that the plate-like guide section 51 extends parallel to the optical axis O and forwardly from the opening 54 at a location radially inwardly of the opening 54. The flexible print circuit board 40 extends along the plate-like guide section 51 and is led into the cylindrical section 52 through the opening 54. The flexible printed circuit board 40 passes around the pin 53 and is changed in direction by 180 degrees. The flexible printed circuit board 40 again passes through the opening 54, and is led forwardly toward the flange 21a of the first cam follower ring 21.

The operation and function of the zoom lens system constructed as above will be described below with reference to FIGS. 1 and 2.

In a state of a minimum focal length, shown in FIG. 1, in which the shutter unit 25 is moved rearwardly to the maximum so that the lens cover tube 27 is retracted into the camera body case 16, the flexible printed circuit board 40 is turned back at the fixed and movable turned-back portions 40a and 40b. That is, the flexible printed circuit board 40 extends along the optical axis O in a triple fashion within the annular space defined between the first and second cam follower rings 21 and 24. A part of the innermost section of the flexible printed circuit board 40 is supported and guided by the plate-like guide section 51 so as not to deflect toward the optical axis O, that is, so as not to enter the optical path to interfere with light rays from a subject to be photographed.

If zooming operation is effected in the state shown in FIG. 1, the cam ring 20 is moved angularly about the optical axis O, so that the first and second cam follower rings 21 and 24 are moved forwardly. By this forward movement, the zooming is carried out. Since the shutter unit 25 moves forwardly together with the first cam follower ring 21, the distance between the shutter unit 25 and the camera body 10 increases.

Since, however, the turning-back element 50 moves together with the first cam follower ring 21, the fixed turned-back portion 40a also moves together with the first cam follower ring 21, so that the distance between the shutter unit 25 and the fixed turned-back portion 40a is maintained unchanged. Accordingly, the movable turned-back portion 40b moves forward, following the movement of the first cam follower ring 21. Moving distance of the movable turned-back portion 40b is half of the moving distance of the first cam follower ring 21 and the shutter unit 25. That is, the distance between the movable and fixed turned-back portions 40b and 40a of the flexible print circuit board 40 is reduced by about half of the moving distance of the first cam follower ring 21.

FIG. 2 shows a state of a longest focal length in which the first cam follower ring 21 moves forwardly to the maximum so that the lens cover tube 27 projects to the maximum. In this state, the flexible printed circuit board 40 is supported and guided by the plate-like guide section 51 and the tongue 12 so as not to deflect toward the optical axis O, that is, so as not to enter the optical path to interfere with the light rays from the subject to the photographed. If the zooming operation is effected from this state toward the state of the shortest focal length, the first cam follower ring 21 approaches the camera body 10 in a reverse manner to that described above, so that the fixed turned-back portion 40a is moved away from the movable turned-back portion 40b. Accordingly, the movable turned-back portion 40b moves toward the camera body 10. Moving distance of the movable turned-back portion 40b is half of the moving distance of the first cam follower ring 21.

As described above, the arrangement of the camera embodying the invention is such that the flexible print circuit board 40, through which the operational and control signals are sent from the CPU 62 to the shutter unit 25, expands and contracts following the zooming operation linearly along the optical axis O within the annular space defined by the first and second cam follower rings 21 and 24. With such an arrangement, it is possible to effect the zooming smoothly. Since, further, the first cam follower ring 21 for retaining and moving the shutter unit 25 is supported and guided directly by the cam ring 20, it is possible to reduce the weight and size of the zoom lens camera.

The flexible printed circuit board 40 is usually made of resinous material having such a property as to reflect light rays. Thus, there is a fear that, harmful light rays that fall incident upon the lens system, i.e., light rays not offered to expose on a film a subject to be photographed are reflected by the flexible print circuit board 40, so as to expose a film. In view of such fear, it is preferable that the radially inward surface of the flexible print circuit board 40 be subject to a reflection preventing process.

What is claimed is:

1. A camera comprising:
   a camera body;
   a movable lens system arranged for movement relative to said camera body along a predetermined optical axis;
   a shutter unit mounted to said movable lens system for movement therewith along said optical axis;
   control means arranged within said camera body for supplying a control signal to said shutter unit for controlling operation of the same;
   flexible means for electrically connecting said control means to said shutter unit, a control signal from said control means being supplied to said shutter unit through said flexible means; and
   movable turning back means for turning said flexible means to form overlapping sections;
   wherein said flexible means extends from said shutter unit to said control means in such a manner that said flexible means is turned back a plurality of times by said turning back means so as to have at least two first and second turned-back portions spaced away from each other along said optical axis, whereby said flexible means has at least three sections, including a first section extending between said shutter unit and said first turned-back portion, a second section extending between said first and second turn-back portions, and a third section extending between said second turned-back portion and said control means, said sections overlapping with each other in a direction normal to said optical axis.

2. The camera according to claim 1, wherein said turning-back means is arranged adjacent to an axial end of said member on a side of said camera body in a fixed relation to said member, for turning said flexible means back to form said first turned-back portion.

3. The camera according to claim 2, wherein said first turned-back portion is located radially inwardly of said second turned-back portion.

4. The camera according to claim 2, wherein said turning-back means includes a guide section for guiding said flexible means so as to prevent said flexible means from being deflected toward said optical axis.

5. The camera according to claim 4, wherein said guide section of said turning-back means extends substantially in parallel relation to said optical axis to support a part of said section of said flexible means extending between said shutter unit and said first turned-back portion.

6. The camera according to claim 5, wherein said turning-back means further includes a cylindrical section connected to an end of said guide section remote from said shutter unit, and a pin arranged within said cylindrical section in concentric relation thereto, said cylindrical section being formed with an opening which faces toward said shutter unit, wherein said flexible means extending from said shutter unit enters said cylindrical section through said opening and extends about said pin and again passes through said opening to form said first turned-back portion.

7. The camera according to claim 1, which further comprises a second lens system arranged between said first-mentioned movable lens system and said camera body in coaxial relation to said first-mentioned movable lens system, said second lens system being independently movable along said optical axis of said first-mentioned movable lens system.

8. The camera according to claim 7, wherein said space within which said flexible means is turned back a plurality of times is substantially annular in shape and is defined between said inner peripheral surface of said first-mentioned movable lens system and an outer peripheral surface of said second lens system.

9. The camera according to claim 1, wherein said flexible means has a radially inward surface which is subject to reflection preventing processing.

10. The camera according to claim 1, further including a movable member arranged between said shutter unit and said camera for moving said shutter unit along said optical axis, said flexible member is turned by said movable turning back means within a space defined by an inner peripheral surface of said member.

11. The camera according to claim 10, wherein said movable member is an annularly-shaped movable member.

12. A cam mechanism in a zoom lens comprising a rotatable cam ring, a front lens group frame movable in the optical axis direction in the cam ring, a rear lens group frame movably supported in the optical axis direction, pins provided on the front and rear lens group frames, said cam ring being provided with cam grooves in which the associated pins are fitted, a shutter unit provided on the front lens group frame, a flexible board which is connected at its one end to the shutter unit, and a direction turning member of the flexible board which is provided at the rear end of the front lens group frame to bend and guide the flexible board.

13. A camera comprising:
    a camera body;
    a photographic system arranged for movement with respect to said camera body;
    control means within said camera body for providing a control signal to said photographic system;
    flexible control signal conducting means for supplying a control signal from said control means to said photographic system; and
    turning means mounted in fixed relation to said photographic system for movement with said photographic system and operative to turn said flexible means so as to form overlapping sections.

* * * * *

UNITED STATES PATENT AND TRADEMARK OFFICE
CERTIFICATE OF CORRECTION

PATENT NO. : 4,951,083

DATED : August 21, 1990

INVENTOR(S) : ZENICHI OKURA et al.

It is certified that error appears in the above-identified patent and that said Letters Patent is hereby corrected as shown below:

On the title page, ABSTRACT, line 7, after "back" insert ---1---.
    At column 1, line 18, change "commercial to" to ---to commercial---.
    At column 1, line 28, before "in" insert ---,---.
    At column 1, line 36, change "print" to ---printed---.
    At column 1, line 45, change "print" to ---printed---.
    At column 1, line 47, after "by", change "a" to ---the---.
    At column 1, line 48, after "make", change "the" to ---a---.
    At column 1, line 53, change "print" to ---printed---.
    At column 1, line 61, after "barrel" insert ---,---.
    At column 2, line 12, after "means", change "." to ---,---.
    At column 2, line 54, change "print" to ---printed---.
    At column 4, line 66, change "print" to ---printed---.
    At column 5, line 1, change "print" to ---printed---.
    At column 5, line 17, change "20" to ---21---.
    At column 5, line 61, change "print" to ---printed---.
    At column 6, line 39, change "print" to ---printed---.
    At column 6, line 61, change "print" to ---printed---.
    At column 6, line 68, change "effect the zooming smoothly" to ---smoothly effect the zooming---.
    At column 7, line 9, after "photographed" insert ---,---.

UNITED STATES PATENT AND TRADEMARK OFFICE
CERTIFICATE OF CORRECTION

PATENT NO. : 4,951,083

DATED : August 21, 1990

INVENTOR(S) : ZENICHI OKURA et al.

It is certified that error appears in the above-identified patent and that said Letters Patent is hereby corrected as shown below:

At column 7, line 10, change "print" to ---printed---.
At column 7, line 12, change "print" to ---printed---.

Signed and Sealed this

Eighth Day of December, 1992

Attest:

DOUGLAS B. COMER

*Attesting Officer*	*Acting Commissioner of Patents and Trademarks*

UNITED STATES PATENT AND TRADEMARK OFFICE
CERTIFICATE OF CORRECTION

PATENT NO. : 4,951,083
DATED : August 21, 1990
INVENTOR(S) : Z. OKURA et al.

It is certified that error appears in the above-indentified patent and that said Letters Patent is hereby corrected as shown below:

At column 7, line 48, (claim 2, line 1) change "claim 1" to ---claim 10---.
    At column 8, line 33, (claim 10, line 4) change "member" to ---means---.

Signed and Sealed this

Twenty-seventh Day of December, 1994

Attest:

BRUCE LEHMAN

*Attesting Officer*      *Commissioner of Patents and Trademarks*